(12) United States Patent
DeTurris

(10) Patent No.: US 8,858,747 B2
(45) Date of Patent: *Oct. 14, 2014

(54) PREVENTIVE MAINTENANCE SYSTEM AND METHOD FOR FIBERGLASS BOATS

(71) Applicant: Stephan DeTurris, Islip Terrace, NY (US)

(72) Inventor: Stephan DeTurris, Islip Terrace, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,044

(22) Filed: Dec. 20, 2012

(65) Prior Publication Data

US 2013/0292032 A1 Nov. 7, 2013

Related U.S. Application Data

(63) Continuation of application No. 11/890,270, filed on Aug. 4, 2007, now abandoned, which is a continuation of application No. 10/857,834, filed on Jun. 2, 2004, now Pat. No. 7,252,727.

(51) Int. Cl.
*B29C 73/00* (2006.01)
*B63B 9/00* (2006.01)

(52) U.S. Cl.
USPC ......... 156/94; 156/98; 264/36.18; 264/36.22; 114/343; 114/355; 114/361

(58) Field of Classification Search
None
See application file for complete search history.

(56) References Cited

PUBLICATIONS

Star Distributing, "Cost Effective Restoration of Decay in Wooden Core Fiberglass Boats", Jun. 2004.*

* cited by examiner

*Primary Examiner* — Justin Fischer
(74) *Attorney, Agent, or Firm* — Alfred M. Walker; Allan Chan

(57) ABSTRACT

A method for preventive maintenance of a boat hull to restore the integrity of a fiberglass boat hull and prevent new water infiltration damage to a boat hull. The wet area repair guidelines using a surface moisture meter. Any balsa cored area reading 15% or above is considered a wet area. Any wood cored area reading 20% or above is considered a wet area. The preventive maintenance steps involve removing all through-hull fittings or hardware. Wet core areas are then dried out using heat lamps, lights or heaters, hot-vac systems, or octopus vacuum with grid system. If necessary, any area not drying out is de-cored and repaired accordingly. After repairs are finished, all through-hull fillings or hardware is reinstalled using new sealant.

17 Claims, 12 Drawing Sheets

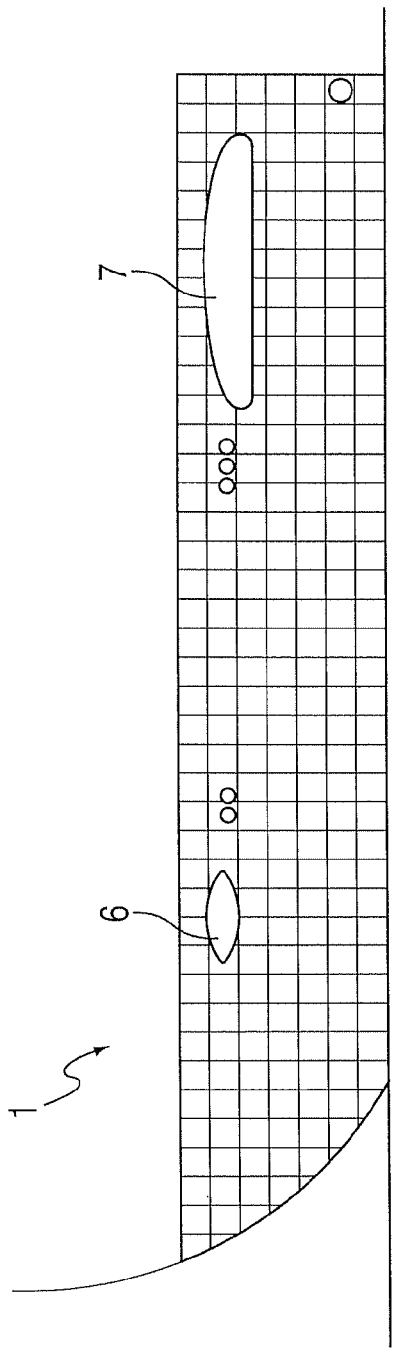
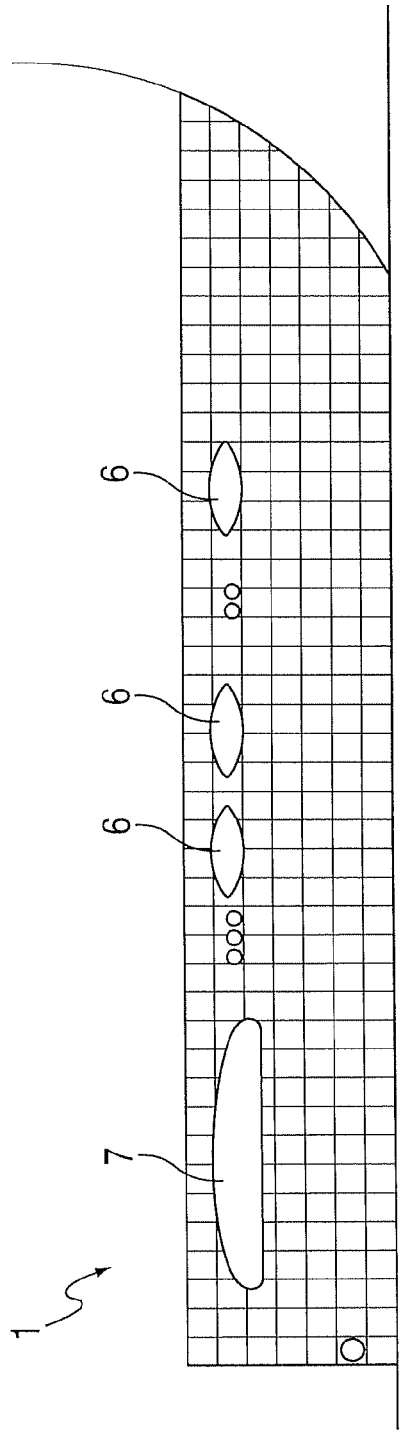
FIG. 2A
FIG. 2B

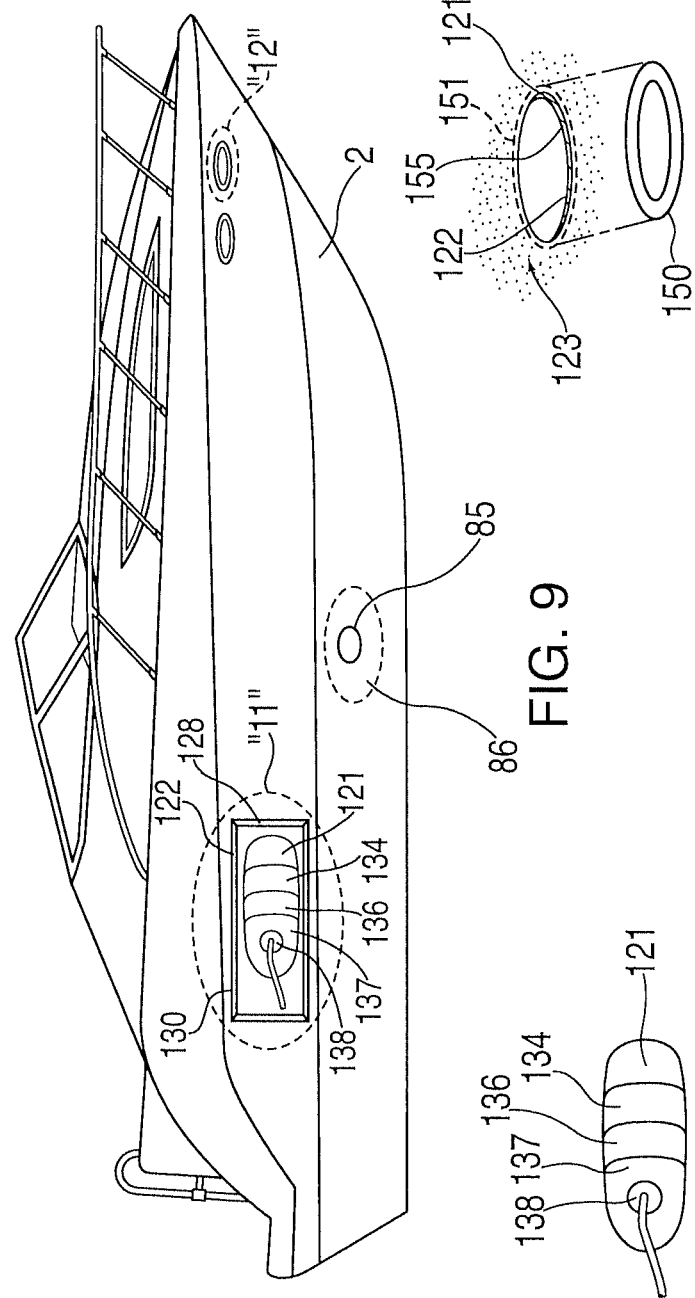

PREVENTIVE MAINTENANCE SYSTEM AND METHOD FOR FIBERGLASS BOATS

RELATED APPLICATIONS

This application is a continuation of application Ser. No. 11/890,270, filed Aug. 4, 2007, which application is a continuation of application Ser. No. 10/857,834, filed Jun. 2, 2004, now U.S. Pat. No. 7,252,727 dated Aug. 7, 2007 and claims priority under 35 U.S.C. 120 from both applications. These two applications are incorporated by reference herein.

FIELD OF THE INVENTION

The present invention relates to prevention of water damage to balsa wood cores of fiberglass boat hulls.

BACKGROUND OF THE INVENTION

Fiberglass boats are typically constructed using an inner and outer fiberglass skin separated by a balsa wood core. The balsa wood core is in the form of small separate blocks pre-attached to a fabric or fabric like material mesh on one side only. This allows the separate blocks to tilt in two directions relative to each other to readily follow the convex contours of a boat. The spaces between the separate blocks are called veins.

While the balsa wood is very light weight and offers adequate crush resistance (on end grain), it is quite vulnerable to water infiltration between the fiberglass skins of a boat which in time may cause the core to decay and then eventually to rot. Typically when this happens, the boat owner puts off repair until the damage is extensive or structural integrity is compromised since the current method of repair is drastic. This expensive procedure involves de-skinning of entire outer fiberglass covering, replacement of the damaged balsa core, and then replacement of the outer skin. This entails hundreds of person-hours of effort and can take a boat out of service for an entire season.

Examination of the prior art reveals several patents related to localized repair of non-metallic structures or objects. U.S. Pat. No. 2,307,958 of Hellier relates to a method of repairing rubber vehicle tires by using air pressure to locate and dry ply separations, by injecting the dry air through a hole with a hollow needle. A cement is then injected to reattach the separated plies.

U.S. Pat. No. 4,236,951 of Krchma et al. relates to a method of treating blisters in asphaltic membrane covered roofs. A selected liquid hydrocarbon miscible with the asphalt of the membrane is introduced through a flexible hose with a puncture output nozzle, and the liquid hydrocarbon is used to heal the localized blistering of the asphalt.

U.S. Pat. No. 4,260,439 of Speer is related to an apparatus and method of plastic repair such as of vinyl seat covers. It involves the use of a tool with a narrow jet of heated air to cure a heat curable repair compound.

Clearly these patents do not teach techniques which can be applied to the repair of fiberglass boat hulls. However, U.S. Pat. No. 5,622,661 of Cederstrom is a method of localized repair of surface blisters of laminated plastic objects including fiberglass boat hulls. Cederstrom '661 is primarily involved with osmosis type damage to the exterior boat hull skin. Using a combination of controlled heat or cooling with mechanical action of a strong compressed air jet, in Cederstrom '661 the damaged area is cleaned and dried in a single operation using a HYAB-osmosis tool. Damaged material below the skin is not removed; instead it is reinforced with a penetrating epoxy.

A similar system is noted in the website of Star Distributing Corporation of Mystic Conn. in their excerpt entitled "Cost Effective Restoration of Decay in Wooden Core Fiberglass Boats©". Star Distributing describes a time-consuming method for repairing wood damaged boat hulls by tapping the boat with a mallet to estimate wood damaged areas by listening for hollow echo sounds, drilling holes in those estimated areas, letting the wood damaged areas dry by ambient air and heat, and then pouring Clear Penetrating Epoxy Sealer (CPES) into the estimated damaged portions of a hull. The method of Star Distributing does not physically remove damaged core; it just treats it with poured CPES. The method of Star Distributing dries out areas with rudimentary ventilation and heat, but not with a system of vacuum plates and sources to facilitate controlled drying and removal of moisture. The only mention of vacuuming in Star Distributing is to a usual domestic vacuum cleaner, but Star Distributing uses a vacuum to remove drill waste, airborne fiberglass particles and water leaking from the lowest drilled hole.

In addition, the method of Star Distributing does not physically remove damaged wood core areas; it only treats drill-exposed areas with poured-in CMES, leaving unexposed, damaged wood core areas which may not be in contact with the CPES, and which may cause further wood rot damage in the future.

Initially, tapping the surface is used by both Star Distributing and optionally by the present invention. But the present invention goes much further. After initial tapping, then the present invention uses the moisture meter/infrared camera, which can accurately predict not just hollow areas, but non-hollow, moisture-ridden areas. The present invention uses an analytical grid pattern, dries wood-infested areas with heat and vacuum, then re-tests the dried areas with the moisture meter/infrared camera, after using the vacuum plate subsystem.

Star Distributing does not remove damaged areas; it only treats them with CMES. In contrast, the present invention uses augers and bits to remove out rotted core; Star Distributing only dries it.

The present invention uses moisture meters to locate water. The present invention uses grids to make moisture location more accurately, and to take notes for future moisture testing. But Star Distributing just pokes holes to examine wood thereat.

If there is water present, Star Distributing uses a vacuum cleaner to remove water at lowest point. The present invention uses vacuum to pull in air from upper holes and leaves it on for days, to facilitate drying. The present invention's continuous vacuuming facilitates fast drying of the core. Star Distributing dries by allowing approximately 1 week drying. But the present invention uses multiple measuring and monitoring with moisture meters and similar devices to ascertain proper drying.

Both Star Distributing's and the present invention's techniques are minimally invasive. But the present invention removes rotted sections of wood core and dries out non-rotted wet areas. Unlike Star Distributing, the present invention uses flexible cable tools and bits to remove rotted wood. The present invention preferably uses chopped fiberglass and epoxy to replace wood core. Star Distributing physically fills bare areas where the present invention removes rotted wood. But Star Distributing, after drying the wood core (whether bad or good) doesn't teach removing wood rot. Additionally, Star Distributing relies heavily by using the mallet tapping to locate holes representing separation of wood from fiberglass (de-lamination). Such a reliance does not rise to the level of sophistication of the present invention, which can detect moisture infested areas even if there is no separation of the fiberglass skin from the adjacent water infested wood core areas.

After drying by ambient air over time (one week), Star Distributing uses liquid CPES that is soaked up by wood that takes a long time to dry. After ambient drying, Star Distributing adds another CPES in-filling. The CPES coat is poured in to replace wood lignum lost to bacterial consumption. In contrast, the present invention is removing and replacing the damaged wood.

Unlike Star Distributing, the present invention also has optional preventive maintenance. Star Distributing does not remove damaged wood, but fills drilled plug holes with Fill It and Layup and Laminating Epoxy (LLE). Star Distributing's main emphasis is use of poring in CPES to the damaged wood.

Clearly, the repair methods of Cederstrom '661 and Star Distributing are different from the present invention. Cederstrom '661 and Star Distributing do not extend the method to a systematic analysis of a fiberglass boat hull having a balsa wood core, by using moisture meter techniques to locate damaged areas not visible to the tapping or to the naked eye, and to heat and remove the damaged wood core with accurately measured minimal incisions of the fiberglass boat outer skin.

The invention of U.S. Pat. No. 5,277,143 of Franguela, Ship Hull Repair Apparatus, describes a device that can be rapidly deployed to repair a breach in the hull of a boat. It acts to plug the hole in the hull and is designed to be installed by a diver from the exterior in an emergency to stem the flow of water into the boat if the breach is below the water line. This apparatus will seal a hole in the hull of any type of construction (eg.—metal, fiberglass, wood) as long as it is sized to be compatible with the damage.

FIG. 1 of Franguela '143 shows the method of installation by a diver. FIG. 1A of Franguela '143 shows a perspective view of the apparatus showing the mounting plate (sealing disk) 15 with two pneumatic storage cylinders 39 and 40 which contain compressed air or other gas to operate the apparatus. The crossectional side view of FIG. 4 permits one to quickly grasp the operational features of the apparatus. In this view, the configuration is as stored and prior to installation. It will be appreciated that four legs (see FIG. 2) 20 through 23 would be pushed through the hull breach protruding into the inside of the boat hull. Pneumatic piston 34 within cylinder 16 is poised to pull on cables 37 which will pivot legs 20 through 23 into the configuration shown in FIG. 7 upon pressure released from pneumatic storage cylinder 44. This action locks the apparatus to the side of the hull aided by distal hooks such as 27 and 28. At this time, compressed gas is released from cylinder 39 to inflate annular sealing bladder 38 to form a water tight seal against the boat hull.

Although the repair is complete, there will be some hydrodynamic drag from the apparatus extending somewhat from the hull surface if below the water line. If above the water line or close to it, the repair also imposed aesthetic problems. Also, the repair may lose viability after long term use due to possible permeation of compressed gas through the flexible sealing bladder. For these reasons, the invention of Franguela '143 is considered to be an emergency and temporary repair apparatus.

In contrast to Franguela '143, the present invention is a repair system and method for fiberglass boats. The present invention is a system for locating core damage in fiberglass boat hulls while in dry dock, removing damaged wood core and repairing water intrusion damage to the damaged wood core areas. Further, drying apparatus involving the use of vacuum pumps and heaters are used to prepare the damaged areas for permanent repair. The method of the present invention is not designed to repair a hull breach which transverses both the outer and inner skins of a fiberglass boat, nor is the repair method applicable to wood or metal hull construction. Both the method and apparatus of the present invention bear no relation to the repair apparatus of Franguela '143.

OBJECTS OF THE INVENTION

It is therefore an object of the present invention to provide a system and method for repair of water damaged balsa wood cores within fiberglass boat hulls.

It is also an object of the present invention to provide for such a system, which minimizes surgical incision, and wholesale removal of large sections of the outer fiberglass skin of a boat hull.

Other objects will become apparent from the following description of the present invention.

SUMMARY OF THE INVENTION

In keeping with these objects and others, which may become apparent the system and method of the present invention replaces only those sections of rotted balsa core of a boat hull as needed while minimizing the damage to the outer fiberglass skin. In early stages of moisture attack, only sporadic regions and spots on the boat are damaged. The boat hull repair method of the present invention locates the damaged areas, dries out the damaged areas, repairs the damaged core, and prevents further damage by closing any leaks in the boat hull skins.

Early attention to these areas using methods of this invention greatly limits the labor content of the repair. Then, as part of the repair, analysis of the moisture entry paths and their repair would prevent further deterioration. The rotted balsa is removed by using rotary cutting tools, and alternatively the chips can be vacuumed out. A preferred embodiment entails the chips, foreign matter, or sediment to be blown out of the boat hull with a tool such as an air chuck or the like. The access to the bad areas is through relatively small holes in the outer fiberglass skin. The cavities thus formed are not refilled by balsa; instead a filled epoxy is used.

Suspected rotted areas are initially spotted by visual inspection, sounding, and "tug" tests. At this point, a moisture meter is used to verify the presence of water-saturated or moist wood; this is done through the outer skin. It is not a highly invasive procedure.

Once a region is identified as having water infiltration, a grid pattern is drawn on the outer fiberglass. A few core samples are taken with a hole saw. Rectangular openings below areas of wet core or wood are cut in the outer skin. Gasketed vacuum plates are attached to the side over these openings and a vacuum pump is attached using a manifold. Now a systematic moisture map of each grid location is made whereby the moisture content of the core is recorded along with the date. More core samples are taken where indicated by moisture readings.

As time goes on, moisture readings will decrease as the vacuum draws in heated dry air. Dry heated air under pressure can also be forced in above the wet core or wood regions. When the moisture reading is very dry (about 5%) The repair of the rotted areas can start.

Using commonly available tools and equipment, the wet core or wood areas of balsa are removed through small openings in the fiberglass shell. Both pneumatic and electrically driven hand tools can be used. Typically, straight and right-angle grinder drivers are used with butterfly cutters, de-burring bits, and other types of de-veining tool bits. Using a drive motor with a tool at the end of a flexible shaft enables one to reach wet core or wood areas far from the edge of a core hole. Thus deep cavities can be made with minimal exterior damage. Wood chips and debris are usually removed by using a tool such as an air chuck or a powerful vacuum at the end of a hose attached to a commercial vacuum cleaner, alternatively any tool which can accomplish the same purpose commonly known to persons skilled in the art may be utilized.

However, the vacuum system attached to the vacuum plates is only used for the drying process. Large attached sections of damaged core are physically removed using a routing procedure with rotary tools and bits. Debris and smaller particles are vacuumed out using a vacuum cleaner.

Once the cavities are made, and after drying, epoxy is mixed with chopped glass mill fiber and the mixture is applied to fill the cavities using a manual or pneumatically driven caulking gun. The skin repair is made by sanding the repair flush with the outer boat contour, applying a seal coat, a gel coat and finally a barrier water proofing.

Instead of taking three months to cut open large sections of a boat hull, the selective incisions and treatment of a core damaged boat hull can be done in less than three weeks duration, with significant labor and material savings.

Therefore, the present invention provides a method for boat repair, which includes detecting troubled areas of the boat, such as water infested wood core areas. The repair procedure further includes boring relatively small cavities within the boat in relation to the troubled areas. Heat is applied to the troubled areas and water damaged particles are blown out and/or vacuumed from the boat through the holes.

Detecting troubled areas is accomplished by utilizing a moisture meter or a heat sensing thermal or infra-red camera to detect the presence of moisture damaged wood core between the inner and outer skins of the boat, or beneath the deck or roof areas of the boat.

Once the moisture-ridden areas are located, areas of the boat are in a grid marked to clearly identify the troubled areas. Typical markings associated with the grid include recording the date and amount of moisture in each grid square if deemed necessary.

Additionally, the method for boat hull repair includes a search in finding the trough of the boat where water accumulates.

Once the areas are identified, the holes are drilled, at suspected damaged areas, and an auger removes particles from within the boat.

While straight augers can be used near the drilled holes for relatively inaccessible areas away from the drilled hole, a flexible auger removes particles from within the boat.

An auger can also be utilized to aid in facilitating the airflow within the boat.

As part of the repair process, heat is applied with a heater, such as a gas driven heater, an electric heater, an infrared heater, a convection heater or by placing the boat within a temperature control room. The heat dries out the moisture, allowing the water damaged particles to be removed and replaced. Heat may be selectively applied to damaged areas, or to the entire boat.

METHOD OF OPERATION

The methods of this invention are intended to identify and repair all wet core hull areas and to perform preventive maintenance on dry hull areas to restore the integrity of a fiberglass boat hull and to prevent new water infiltration damage beyond the level of a new hull.

The wet area repair guidelines using a surface moisture meter such as a model GRP33 use the following criteria. Any balsa cored area reading 15% or above is considered a wet area. Any wood cored area reading 20% or above is considered a wet area. In addition, any balsa/wood cored area with a relative difference of 5% or more than the average moisture reading of the surrounding area is considered wet and must be repaired.

An overview of the repair steps involves removing all through-hull fittings or hardware. Wet core areas are then dried out using heat lamps, lights or heaters, hot-vac systems, or octopus vacuum with grid system. If necessary, any area not drying out is de-cored and repaired accordingly. After repairs are finished, all through-hull fillings or hardware is reinstalled using new sealant. The recommended sealants are 3m 4200 Marine Grade Sealant/Adhesive for both below the waterline and above the waterline.

The preferred methods of repair are well described in the above sections of the invention relating to a minimally invasive procedure requiring the drying out of wet core areas. These methods offer great benefits in reduced labor costs; they are described in the text above and FIGS. 1 through 9A. In cases where the core is not responding to drying attempts, the areas are de-cored. This can be accomplished either from the interior, as detailed in the discussion of FIG. 11, or from the exterior in a similar procedure. If performed from the interior, clear access must be provided to the repair area. All equipment, sole plates, insulation, and all other items that may prevent clear access must be removed prior to the repair.

Obviously, all removed items must be replaced after the repair. If the de-coring is performed from the exterior of the hull, access is more easy. The procedure is similar to that in FIG. 11, but it is the outer laminate instead of the inner laminate that is penetrated. Also, It is the schedule and finish of the outer laminate that must be matched in the final steps.

The general preventive maintenance guidelines call for three different approaches applicable to three different regions of a hull. First, all dry areas below the waterline are to be disassembled, de-cored and reassembled with new sealant. The steps in this procedure are detailed in the discussion of FIG. 12. Secondly, all dry areas above the waterline will be cleaned of all old sealant around the outside edge of the hardware; then the hardware is resealed from the exterior with a new bead of sealant. Third, all gunnel/stainless is removed and inspected. The steps for preventive maintenance of this region are described in the text for the maintenance chart of FIG. 10B.

BRIEF DESCRIPTION OF THE DRAWINGS

The present invention can best be understood in connection with the accompanying drawings. It is noted that the invention is not limited to the precise embodiments shown in drawings, in which:

FIGS. 2A and 2B are side elevational views of grid systems shown depicted upon respective left and right sides of a boat hull, showing sources of water intrusion, such as port hole windows and motor vent holes;

FIG. 9 is a close-up elevational view of a portion of a boat hull being treated in accordance with the system and method of the present invention;

FIGS. 10A and 10B together constitute a combined chart entitled, "Repair and Maintenance for Fiberglass Hulls";

FIG. 11 is a cutaway side view, taken as shown in the dashed line ellipse "11" shown in FIG. 9, showing a damaged area of the hull with a wet core section, further showing the outer skin removed and showing various layers progressively downward and inward through the hull with a section of the inner laminate (skin) removed and the wet core area cut out with a bevel to effect a de-core procedure from the interior of the boat; and, FIG. 12 is a close-up exploded view 12 of a hull detail with through-hull hardware shown as being just removed for preventive maintenance below the waterline taken as shown in the dashed line ellipse designated as "12" in the region of the porthole shown at the front end of boat hull 2 shown in FIG. 9.

DETAILED DESCRIPTION OF THE DRAWINGS

Figure 1:
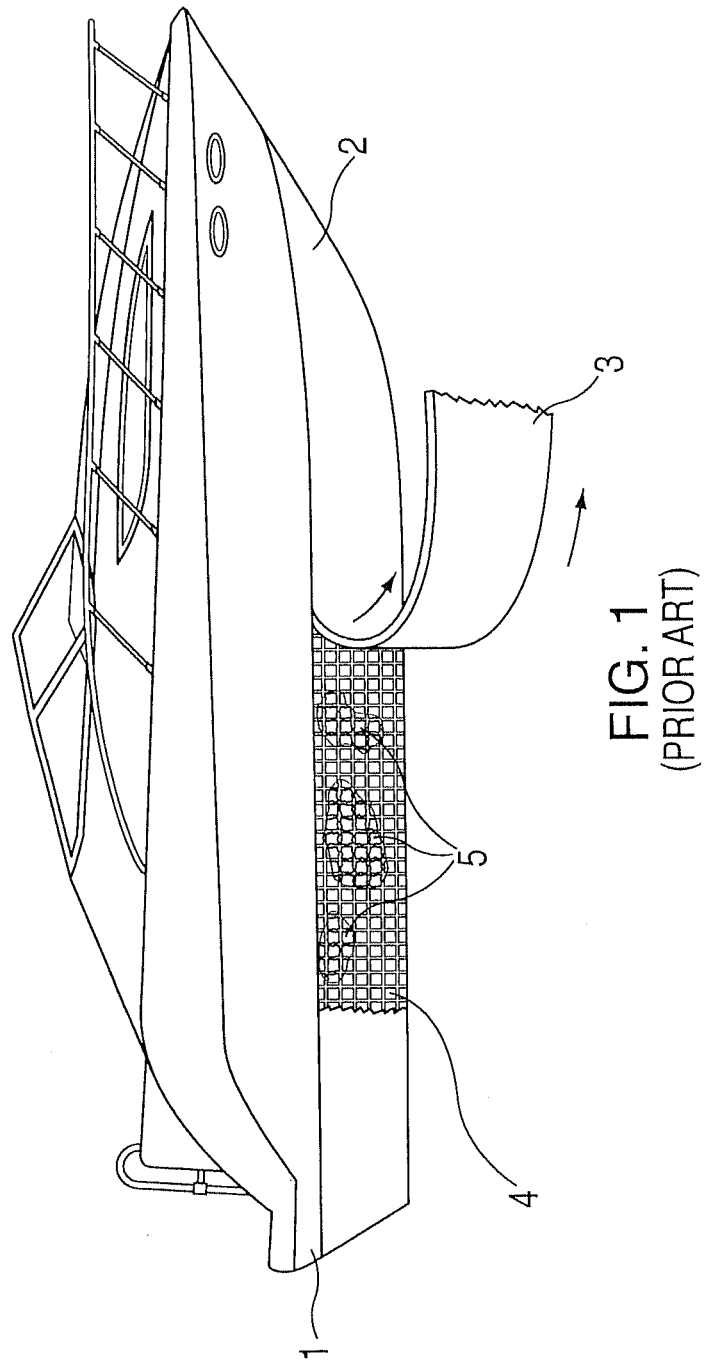
FIG. 1 is a perspective view of a prior art boat hull repair method, wherein a portion of boat hull with a major part of the fiberglass skin is peeled away, revealing the damaged areas of the core.

FIG. 1 illustrates a prior art method of boat repair which involves peeling back of the fiberglass skin to locate and repair the damaged areas. Boat hull 1 is shown with part of the fiberglass skin peeled back 3 from its normal attached position 2 to reveal damaged areas 5 in the exposed balsa block core 4. This analogous to "major surgery" as compared with the "laparascopic surgery" approach of this invention.

Figure 1A:
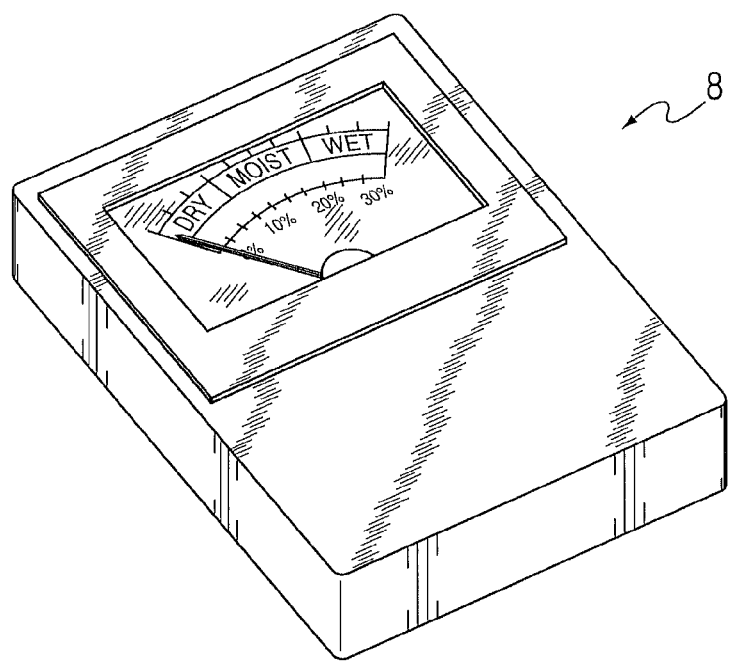
FIG. 1A is a perspective view of a moisture meter used in diagnosing a moisture damaged core of a fiberglass boat hull requiring treatment according to the system and method of the present invention.

FIG. 1A shows an analog moisture meter 8. Digital meters as well as moisture probes attached to PDA's or laptop computers are also available. Infrared cameras, or other remote moisture detectors, may also be used for thermal imaging of moisture presence.

Figure 1B:
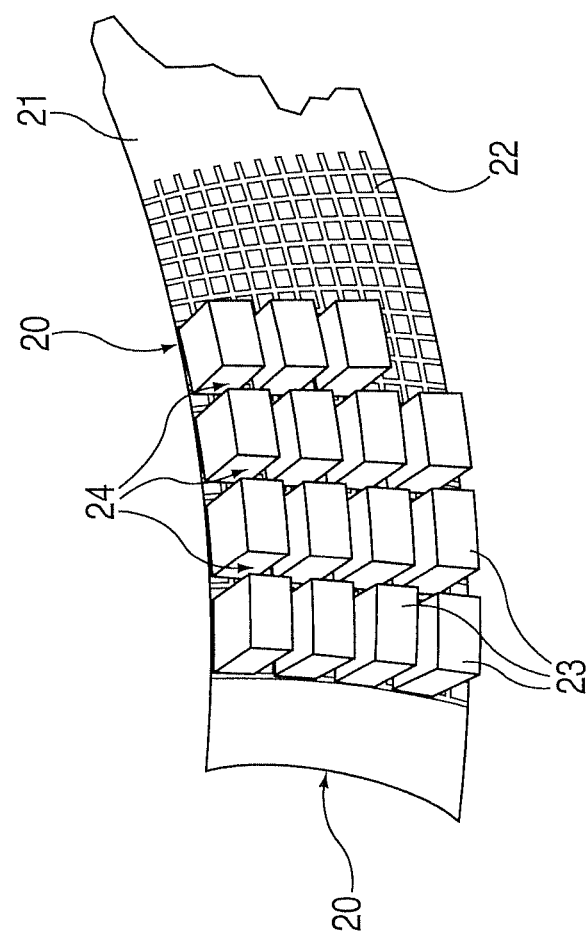
FIG. 1B is a perspective view of a collection of fabric backed balsa wood core blocks inside a boat hull, shown with the outer fiberglass skin layer removed.

FIG. 1B is a hull detail showing compound curve contour 20, balsa blocks 23, mesh 22 to which blocks 23 are preattached, and the inner fiberglass to which mesh 22 is loosely attached. Note that blocks 23 can adjust to hull contour 20; in so doing spaces or veins 24 are formed between the balsa blocks. These veins 24 often act as conduits for infiltrated water which is then conducted to damage larger regions.

Figure 2:
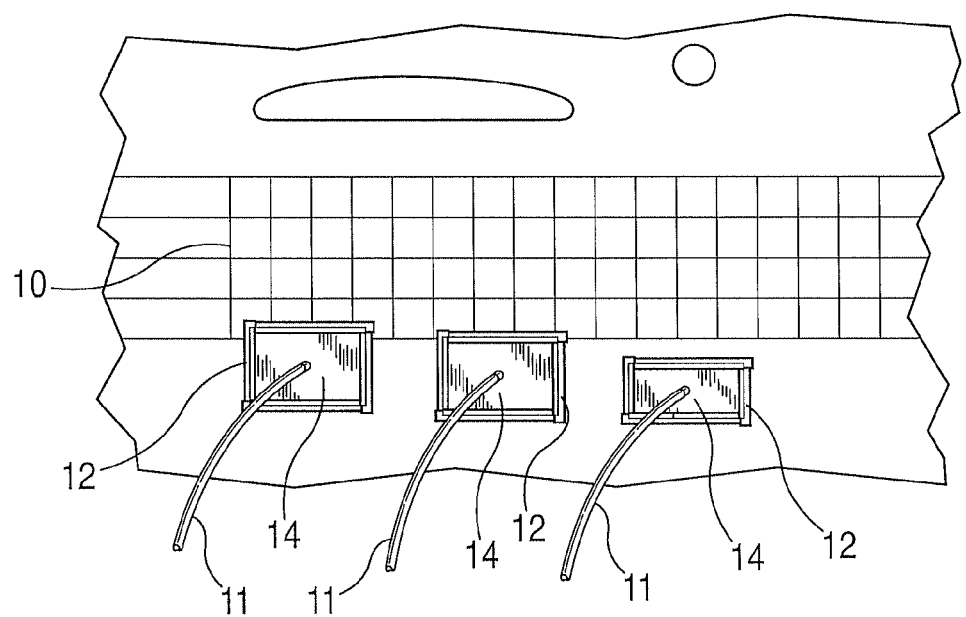
FIG. 2 is a front elevational view of a portion of a boat hull being treated in accordance with the system and method of the present invention.

FIG. 2 is an exterior hull section 1 with skin intact. Grid region 10 is drawn on the surface for a systematic moisture survey of the surface to locate damaged areas. Vacuum plates 14 are attached over openings in the hull to extract moisture from damaged areas via vacuum hoses 11. Tape 12 is used to attach plates 14 to the hull.

FIGS. 2A and 2B show two different sides of boat 1 hull respectively. They show the location of port hole windows 6 and motor vents 7.

Figure 3:
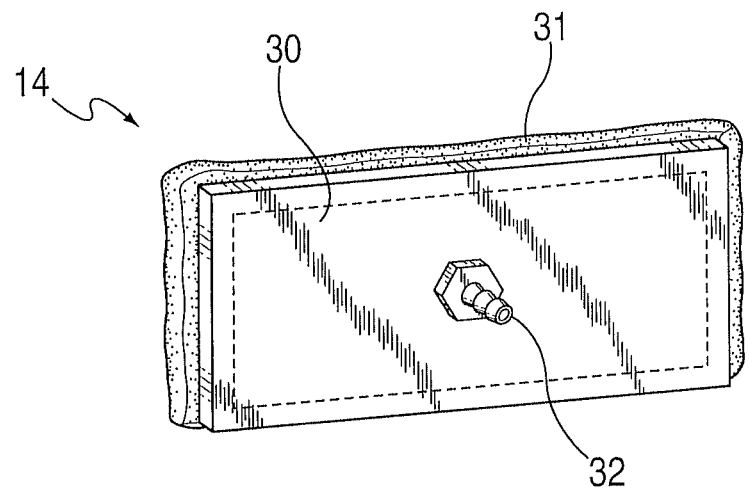
FIG. 3 is a close-up perspective detail view of a vacuum draw plate used in connection with vacuum cleaning of moisture and damaged wood core debris of a boat hull being treated in accordance with the system and method of the present invention.

FIG. 3 is a close-up of vacuum plate 14. It preferably includes a preferably transparent plate 30 such as of polycarbonate, gasket 31, such as of a flexible sealing material such as closed cell foam, which forms an airtight seal against the hull, and hose barb 32 for attachment to vacuum hose.

Figure 4:
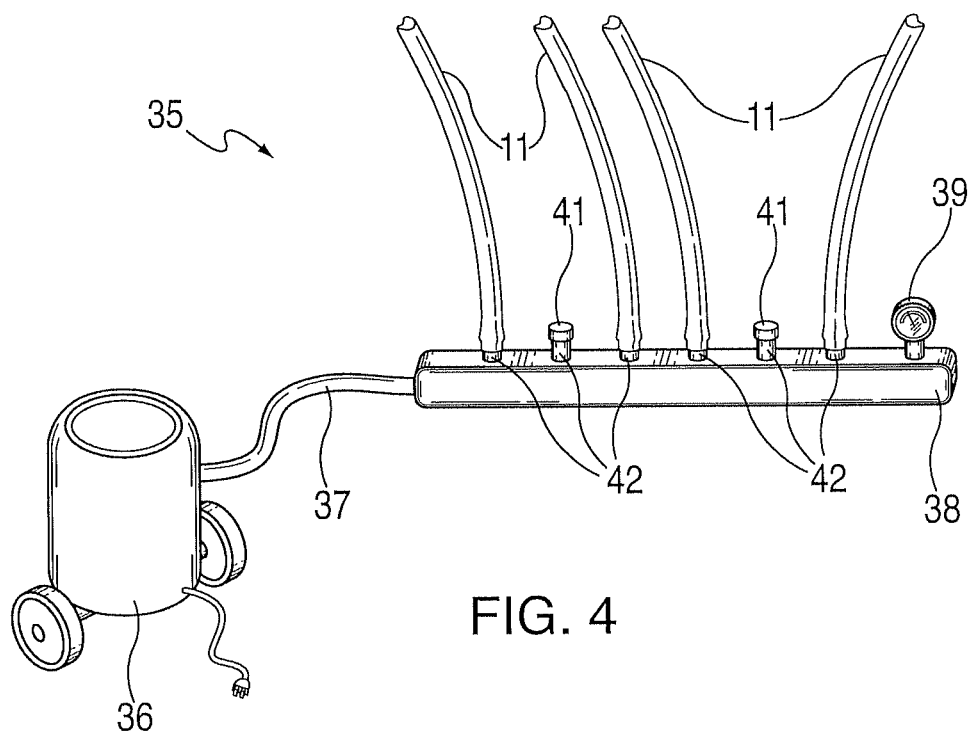
FIG. 4 is a close-up perspective view of the vacuum system of the present invention.

FIG. 4 shows a stand-alone vacuum system 35. Commercial vacuum pump 36 is attached via large vacuum hose 37 to vacuum manifold 38. Vacuum gauge 39 indicates vacuum. A number of hose barbs 42 are used for attachment of vacuum hoses 11. Those barbs 42 not used are capped by seal caps 41 to prevent vacuum leakage.

Figure 4A:
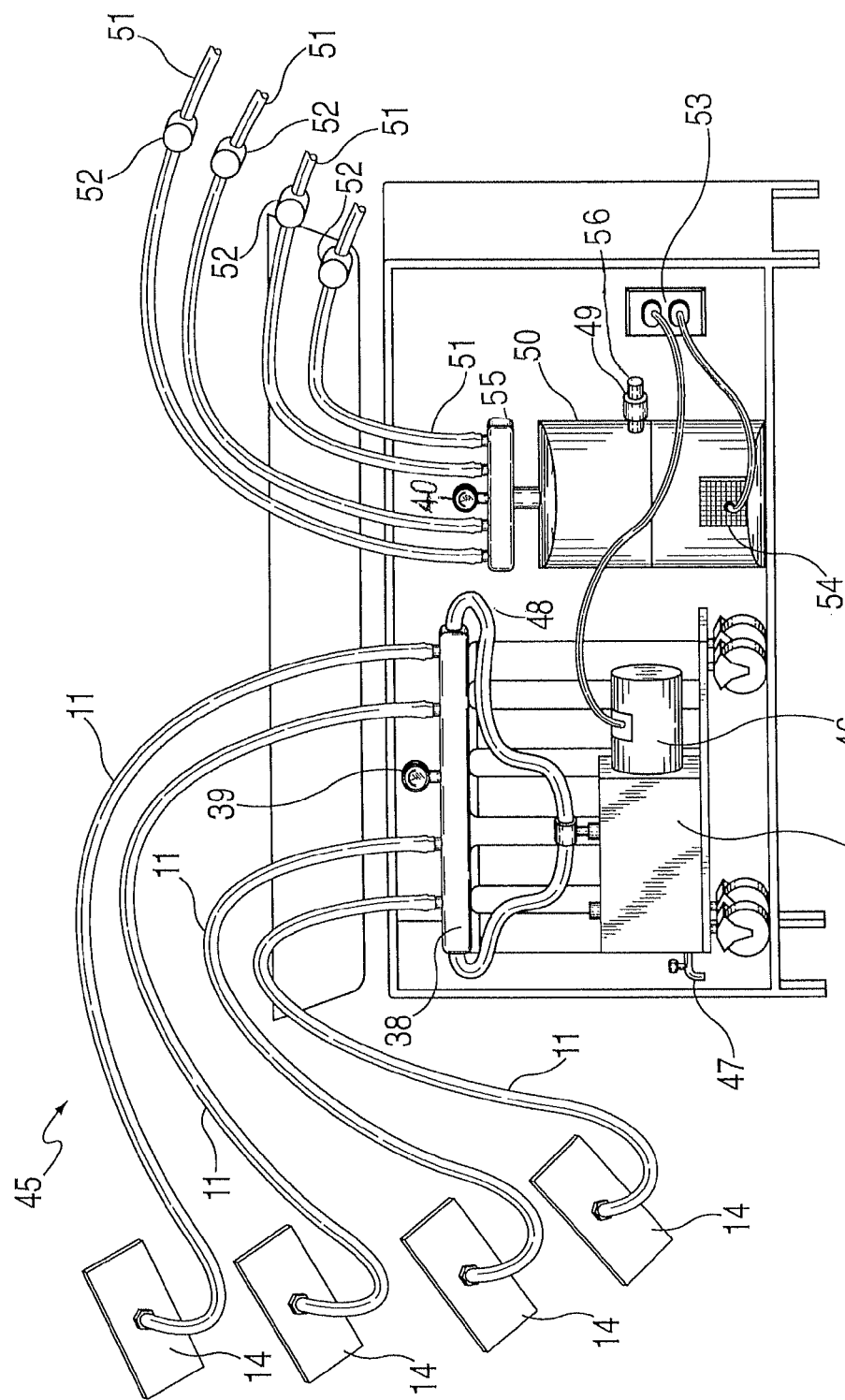
FIG. 4A is a perspective view of the vacuum and pressure systems shown in place at a boat hull to be repaired.

FIG. 4A shows a combined vacuum and pressure center 45. Vacuum pump 36 is powered by motor 46 which is plugged into outlet 53. Intake line 48 from manifold to vacuum pump attaches to vacuum manifold 38; drain spigot 47 is to drain out accumulated water from the air drawn in by vacuum pump 36. Vacuum hoses 11 are attached to vacuum plates 14. The pressure supply side obtains compressed air from an external source via compressed air line 56 which is attached to air inlet filter 49 on air tank 50. Electric heater 54 attached to outlet 53 heats the compressed air in tank 50 before it is distributed via compressed air manifold 55 and hoses 51 to line filters 52. These lead to input openings in the fiberglass hull skin to aid in drying damaged areas. Compressed air gauge 40 indicates pressure at manifold 55.

Figure 5:
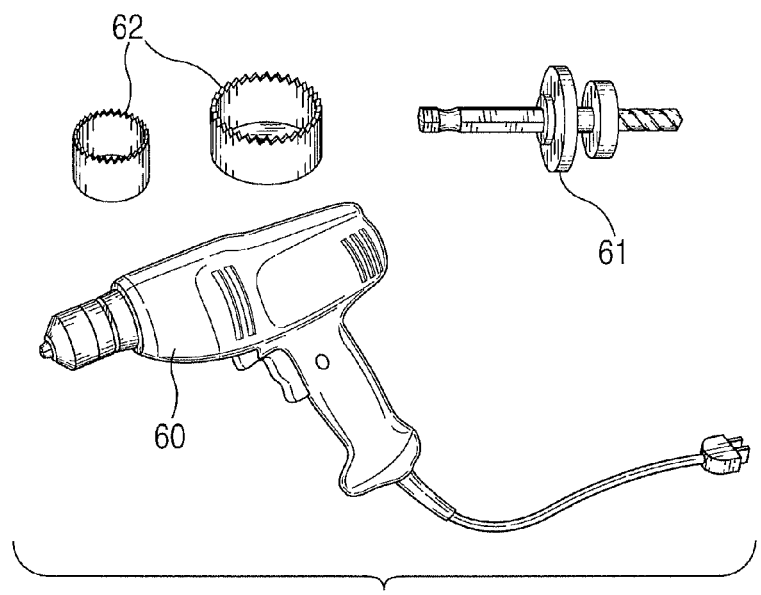
FIG. 5 is a close-up detail view of saw equipment used for introducing incision holes of the system and method of the present invention.

FIG. 5 shows hole saw equipment including electric drill driver 60, mandrel 61, and two sizes of hole saw 62. A cordless version can be used as well.

Figure 6:
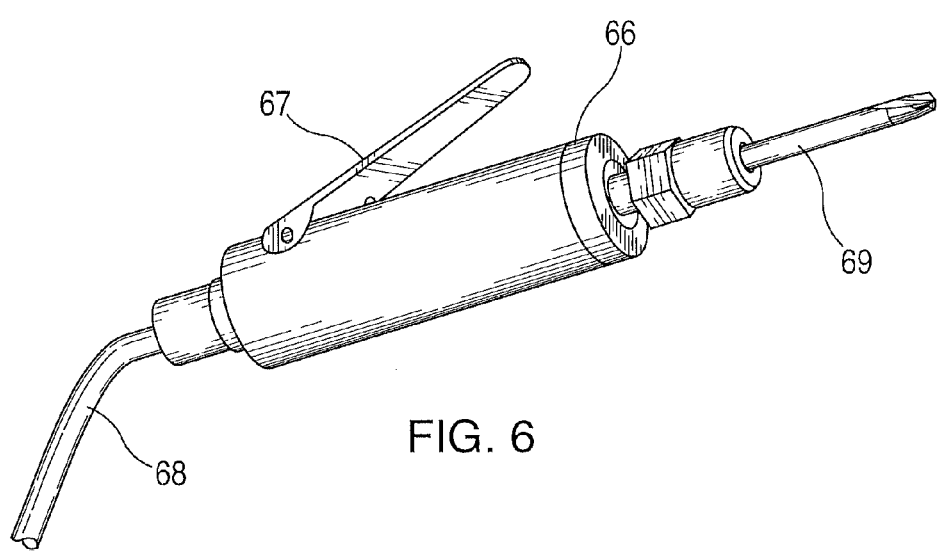
FIG. 6 is a perspective view of a straight oriented hand-held drilling and routing tool of the system and method of the present invention.

FIG. 6 shows a straight pneumatic tool 66 powered by compressed air hose 68 with control valve 67 and veining bit 69.

Figure 7:
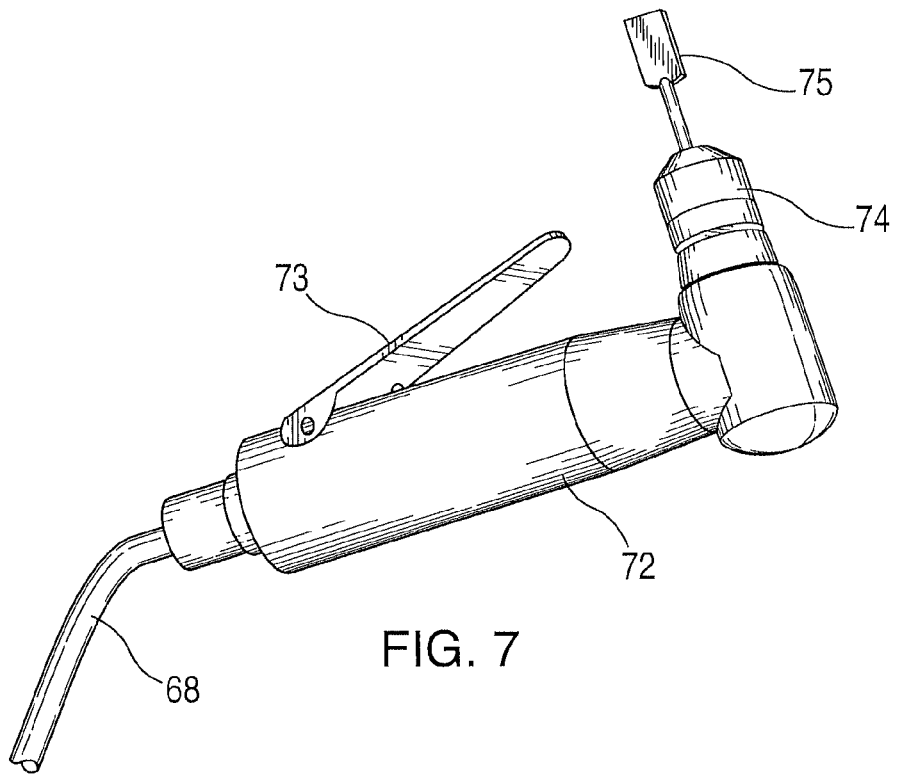
FIG. 7 is a is a perspective view of a bent, right angle oriented hand-held drilling and routing tool of the system and method of the present invention.

FIG. 7 shows right angle pneumatic driver 72 with control valve 73, chuck 74 and butterfly bit 75.

Figure 8:
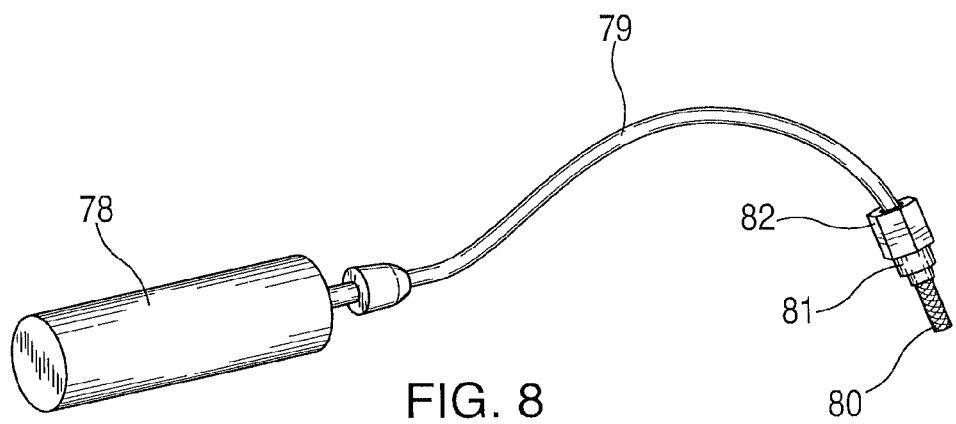
FIG. 8 is a is a perspective view of a flexible oriented hand-held drilling and routing tool of the system and method of the present invention.

A flexible shaft driver 78 with flexible shaft 79, guidepiece 82, collet 81 and deburring tool 80 is shown in FIG. 8. It can be electrically or pneumatically driven.

A section of attached fiberglass skin 2 is shown in FIG. 9. It has core access hole 85 which enabled the removal of damaged core region 86.

Figure 9A:
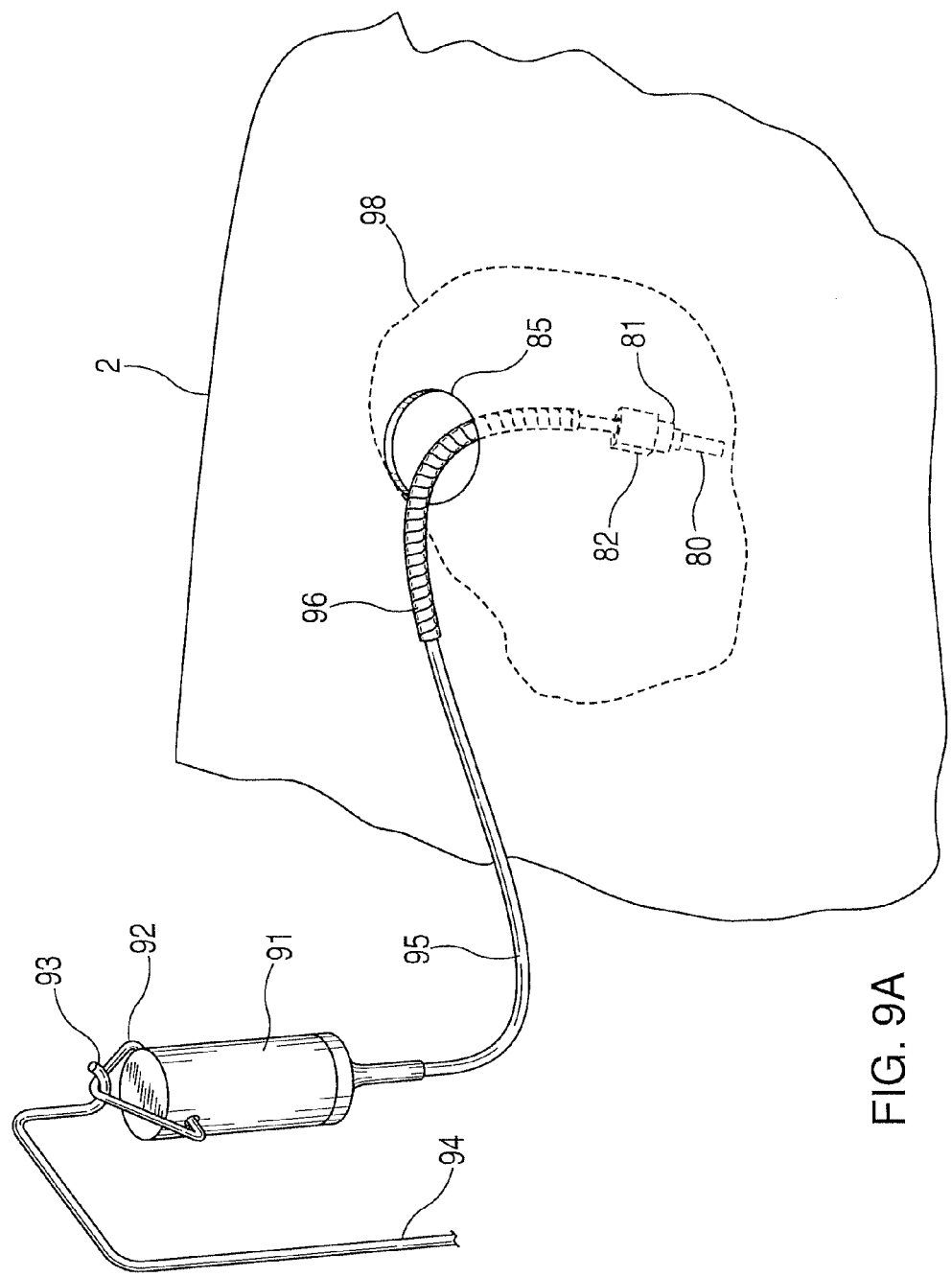
FIG. 9A is a close-up elevational view of a flexible auger used on a portion of a boat hull being treated with the system and method of the present invention.

FIG. 9A illustrates the use of a modified flexible shaft auger 90 in removing damaged core creating cavity 98 through access hole 85. Here adjustable stand 94 with hook 93 supports motor 91 via hanger loop 92. Flexible shaft 95 feeds through a bendable semi-rigid outer covering 96 (like that of a gooseneck lamp) to emerge at guidepiece 82. Collet 81 retains cutting tool bit 80. The modification is the addition of sleeve 96 which permits tool 80 to be oriented in any direction to gouge out cavity 98.

Figure 10A:
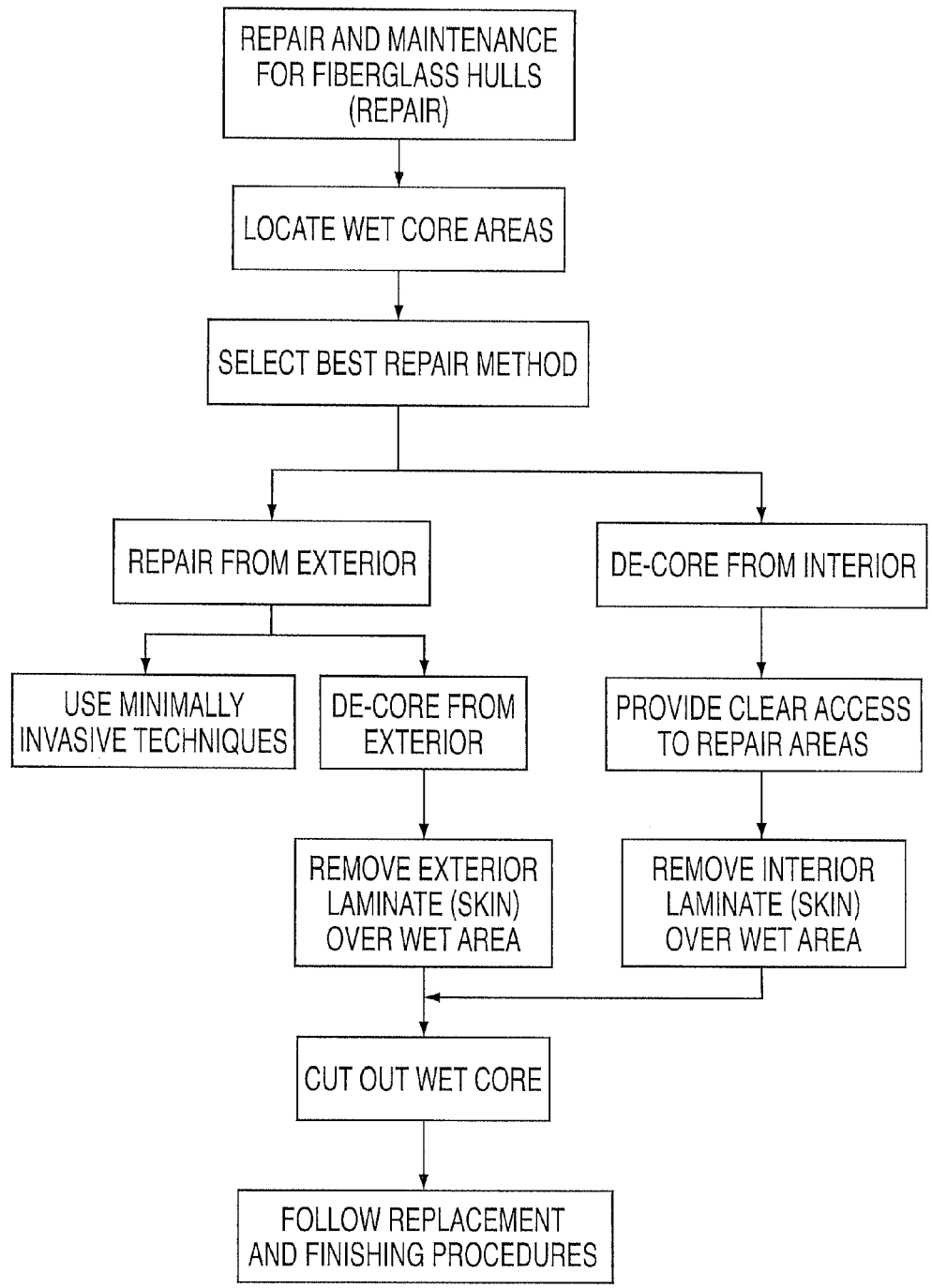
FIG. 10A is a chart showing the relation between the different repair techniques of this invention for repair of wet core damaged areas in fiberglass boat hulls.
Figure 10B:
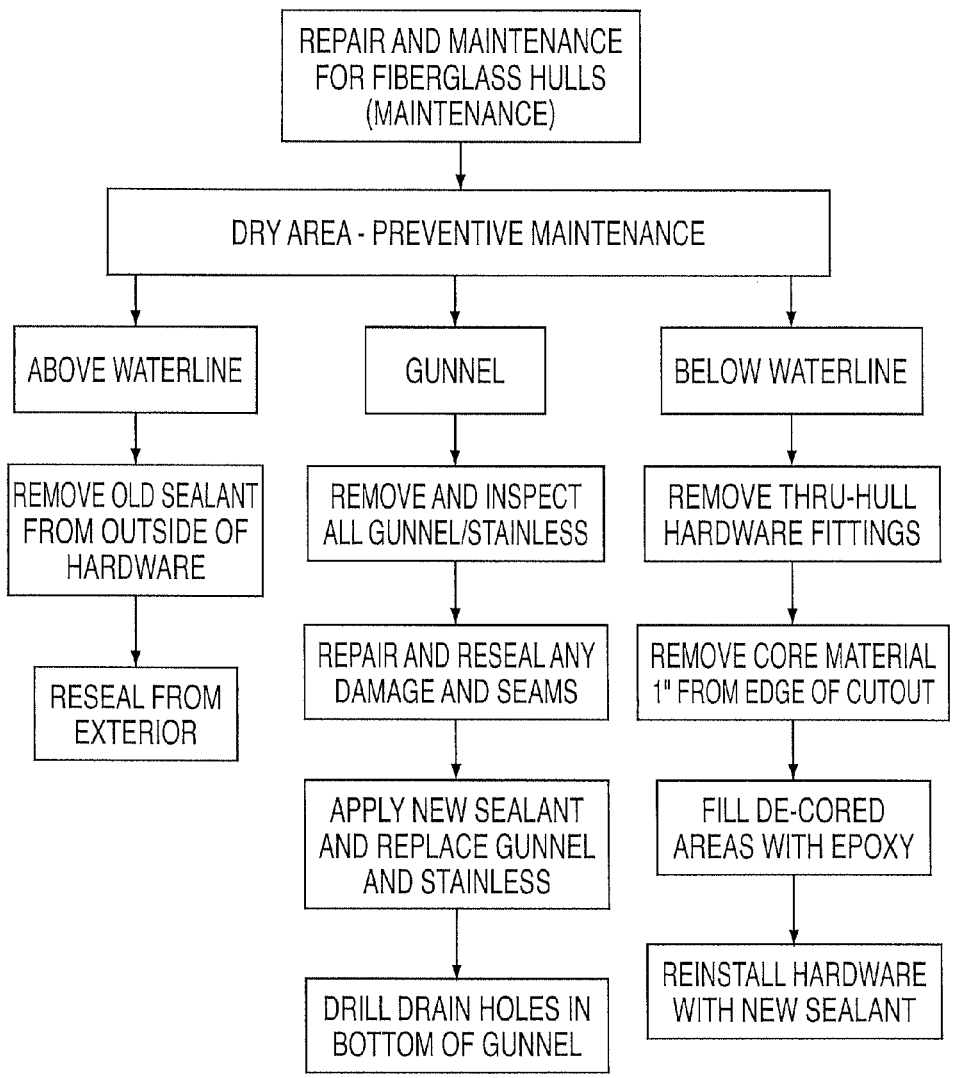
FIG. 10B is a chart showing the preventive maintenance techniques of this invention for different areas of a fiberglass boat hull.

The repair and maintenance charts of FIGS. 10A and 10B illustrate the relationships between the different techniques of this invention in renewing the integrity of fiberglass boat hulls. In the repair chart of FIG. 10A, the first step is to locate the wet core areas as discussed above with the use of a moisture meter and possibly drawing a grid system on the exterior hull surface for accurate data collection of moisture content over time. While the preferred method of repair is the minimally invasive method discussed above (shown as the leftmost branch), in some cases, stubborn wet areas are found which do not respond to the drying techniques already discussed in detail. In these cases, either the inner or outer laminates or skins are actually removed over the entire wet area. This can be done from the interior whereby no repair is required on the highly visible exterior surface. In some cases, the wet area cannot be reached from the interior and the repair must be made from the exterior surface. This method of repair is called de-coring whereby the wet core section is actually cut out. Then, new core material is added, and the repair area is finished to blend in with the rest of the inner or outer laminate in the vicinity. This process is commonly done when the core is rotted. Alternatively, the outer skin is surgically cut in the vicinity of the water damage to facilitate drying of the cores which have no rot.

The dry areas of the hull are treated to three basically different preventive maintenance techniques as described by chart 10B. Above the waterline, old sealant is cleaned or removed from around any hardware. Then a bead of new sealant is used to seal the exterior of the hardware.

All gunnel/stainless is removed and inspected. All broken or bent screws are removed, and misdrilled holes or deck-to-hull seams are repaired and/or sealed with sealant. The gunnel/stainless is then reinstalled with a new bead of sealant. Finally, drain holes are drilled in the gunnel molding on the underpart.

Below the waterline, all through-hull hardware is removed. Core material is carefully removed to a predetermined depth such as, between one to two inches from the edge of the cutout. The de-cored areas are then filled with epoxy before the hardware is reinstalled with new sealant.

FIG. 11 is a side cutaway view, taken as shown in the dashed line ellipse "11" shown in FIG. 9, of an example of a wet area repair from the interior of the hull, illustrating the progressive steps encountered in the repair. In the cutaway view of FIG. 11, the uppermost item shown is the vacuum suction cup 138, which is placed above and having a connection through plastic bag 137, under which is bleeder fabric layer 136, then strip ply/peel layer 134 and the lowest layer, which is fiberglass level 121. FIG. 11 also shows the affected region after inner laminate 122 is ground back until all damaged areas are removed. Inner laminate 122 is tapered back at region 128 to a suitable taper, such as, for example, a 20:1 taper ratio and the wet core is removed with a tool, such as a sharp bevel. This area is further prepared by grinding or filling any voids with a filler, such as, for example, polyester putty. All dust and loose debris is blown out and/or vacuumed out of the area to be laminated. The next step is to apply the first layer of fiberglass. This involves solvent-wiping the prepared laminate area and then applying, for example, 2 oz/sq.ft. chopped strand mat (CSM) or other suitable material, to the repair area with a appropriate overlap, such as a two inch overlap, at the perimeter. This new laminate layer is then allowed to cure. The opposite skin and laminated perimeter 130 is prepared for replacement of the core by grinding to a near white condition and insuring the overlaps are smooth. The next step is to prep the new core. The new core is pattern cut and pre-fit to the repair area. The edges are machined to closely fit the beveled perimeter. All dust and foreign debris is again blown out and/or vacuumed out from the repair area. The next step is bedding of the new core material. Bagging of the core involves first placing a seal, such as tacky tape, around the perimeter of the prep area. The bedded surface of the balsa core is then primed with a primer, such as, for example, catalyzed V/E resin, before bedding. Next, using the V/E resin, chopped strand mat material, such as at least 2 oz/sq.ft. of the chopped strand mat (CSM) materials, are applied and catalyzed. Vacuum bag 137 is carefully sealed around the periphery using a seal, such as for example, tacky tape 132. Vacuum is then applied through vacuum port suction cup 138. After cure, bag 137 is removed. The core is ground and detailed, cleaned, and then primed with catalyzed resin. When resin is cured, any voids are filled with a filler, such as for example, polyester putty. All excess putty or resin/fiberglass are cleaned from the core. Repair area is then prepared for the replacement laminate by grinding the perimeter to a near white condition. The core is feather ground to eliminate any excess portion of excess putty. The area to be laminated is again vacuumed and cleaned. The final step is the step of installing the new surface laminate. The repair area to be laminated is solvent wiped, and then the original inside laminate schedule is applied. This involves installing the first laminate ply to overlap the existing laminate by an appropriate dimension, such as, for example, a minimum of two inches. Each successive ply should overlap the previous by a minimum dimension, such as, for example, of one inch. After curing, a light grinding of between each set of laminates is performed. Finally the exposed surface finish should replicate the original interior surface and be equal in finish to the existing production standard.

FIG. 12 illustrates dry area preventive maintenance procedures used below the waterline. FIG. 12 is a close-up exploded detail view of the region surrounding any through-hull hardware feature, taken as shown in the dashed line ellipse designated as "12" in the region of the porthole shown at the front end of boat hull 2 shown in FIG. 9. In FIG. 12, removed hardware 150 is shown removed from the porthole. Outer fiberglass laminate 121, dry undamaged core 123 and inner laminate 122 are shown. The next step of the procedure includes the step where one appropriate sections 151, such as for example, one inch deep sections, of core 123 are removed from between laminates 121 and 122. After the cutout is cleaned out, de-cored regions 151 are filled with an epoxy 155, such as, for example, West Systems Marine Epoxy. After epoxy 155 is set, it is sanded smooth. Then the true-hull hardware 150 is reinstalled with new sealant, such as for example, as 3M 5200 Marine Grade Sealant/Adhesive.

DETAILED DESCRIPTION OF THE PREFERRED EMBODIMENTS

The present invention has broad applications to many technical fields for a variety of articles. For illustrative purposes only, a preferred mode for carrying out the invention is described herein, wherein a repair system for treating boat hulls with rotted balsa wood cores utilizes a minimally invasive incision and treatment technique of the fiberglass boat hull.

As shown in FIG. 1, in a prior art boat hull repair method, a major portion of boat hull 1 with a large part of the fiberglass skin 3 is peeled away from fiberglass skin 2, revealing the damaged areas 5 of the balsa wood core of hull portion 4 to be treated and removed.

In contrast, in the present invention, general areas 5 of moisture damage to a boat hull 1 are determined by exposing the exterior surface of a boat hull 1 to a moisture detector 8, such as a moisture meter as shown in FIG. 1A, or by other moisture sensing equipment, such as a thermal or infra-red camera. A typical moisture meter 8 has either a digital or analog output, showing moisture readings of from zero to about thirty percent moisture content on a relative scale extending from a very dry condition to a most condition and finally to a wet condition.

FIG. 1B shows a collection of fabric backed balsa wood core blocks 23 inside a boat hull 1, shown with the outer fiberglass skin layer removed. The balsa wood blocks are shown slightly fanning outward along a rear curved inner fiberglass reinforced fabric mesh backing 22 attached to an inner fiberglass skin 21, following a curve contour 20 of the boat hull 1. The triangular area gaps located between adjacent balsa wood blocks 23 are defined as veins 24, through which water intrusions flow, thereby damaging adjacent balsa wood blocks 23. When water intrudes into the area between the inner fiberglass layer 21 and outer fiberglass boat hull skin layer 3, these balsa wood blocks 23 are susceptible to moisture damage and rot, thereby interfering with the structural integrity of the inner buoyant core of the boat hull 1.

As shown in FIGS. 2 and 9, the boat hull repair system and method of the present invention removes the aforementioned moisture and water damaged wood core from within the fiberglass skin layers 3 and 21 of a boat hull 1.

FIGS. 1 and 2 show a front view of a side of a boat hull 1, typically comprising an exterior fiberglass skin 3 and an interior fiberglass skin layer 21 shown in FIG. 1B, both separated by a core of a plurality of small, flat edged balsa wood core blocks 23 connected by a flexible fiberglass reinforced textile mesh strips 22, as shown in FIG. 1B, which allows the incremental placement of the individual, generally linear based, blocks 23 over one or more complex curves 20 of the boat hull. Typically the blocks 23 are one to two inches in length, with thickness' varying in a range of from about one quarter (¼) inch in thickness to about three quarters (¾) inch in thickness. Often the balsa wood blocks 23 are either three eighth (⅜) inch to about one half (½) inch in thickness.

Although the blocks 23 are positioned adjacent to each other, as shown in FIG. 1B, they are spaced apart from each other by a small distance, to allow the incremental bending of the strip of flat blocks 23 over a complex curve contour 20 of the boat hull 1. However, these spaces, referred to in the maritime trade as "veins" 24 are vulnerable to exposure to water running therethrough, from cracks or damaged seals in the boat hull 1 or its accessory structures, such as port holes, gunnel molding, weep holes in the anchor area or ventilation holes. Other areas of water intrusion include the motor compartments of the boat. Water further collects in the trough areas of the boat hull 1, where the complex curves 20 are of such configuration that they cannot be filled by balsa wood blocks 23.

The balsa wood cores shown in FIG. 1B before moisture damage thereto, are susceptible to water induced rot, eventually pulverizing and leaving areas having a lack of structural integrity in the areas of damaged and pulverized balsa wood core blocks 23.

The prior art generally includes macro cutting of large sections of the damaged balsa wood core areas of blocks 23 underneath the outer fiberglass skin 3 of the boat hull 1, and surgically removing wholesale sections of balsa wood block aggregates.

In contrast, as shown in FIGS. 2 and 9, the present invention uses selectively placed microsurgical incisions, to make minor incisions in the outer fiberglass skin 3 of the boat hull 1, and selectively targeting the moisture ridden areas of the balsa wood core blocks 23 shown in FIG. 1B before moisture damage thereto between the inner and outer fiberglass layers 3 and 21 of the boat hull 1.

First, the boat hull 1 is examined with moisture meters 8, shown in FIG. 1A, to ascertain the general area of moisture infestation before any cuts are made into the outer boat hull skin 3. Thermal imaging cameras can also be used.

Then, as shown in FIG. 2, a grid region 10 is laid out over the general areas of moisture infestation, and selective cuts are made to identify the exact locations of the moisture ridden core areas of balsa core blocks 23. As shown in FIG. 5, holes may be cut, for example, by a hand-held hole drill 60 having a mandrel 61 holding cylindrical serrated, barbed hole saws 62. Typically the grid region 10 is graphed out by using a grease pencil or other marker and a straight edge, such as a ruler or yardstick. Additionally, the grid pattern can be implemented by optical projections or other similar temporary marking means. The grid region 10 is broken down into discernable sections, labeled by section labels, such as, for example, "A", "B", "C", etc.

Normally the grid region 10 shown in FIG. 2 is not marked all the way up to the top of the boat hull 1, because the top portion of a boat hull 1 is normally not infested with water permeation.

The grid region 10 is dated at locations of significant moisture readings every two or three days during treatment. Moisture readings are repeated during treatment, to ascertain whether moisture content has decreased from wet readings of between twenty and thirty percent concentration, to a relatively dry concentration of less than ten percent moisture content, during treatment of the boat hull 1 with the heating and vacuum system and method of the present invention, whereby vacuum plates 14 are attached with fastening means, such as tape 12, over openings in the hull 1 to extract moisture from damaged areas via vacuum hoses 11. As shown in FIG. 3, vacuum plates 14 include transparent plate portion 30, such as of polycarbonate, and at least one vacuum hose barb 32, to which is attached a respective vacuum hose 11 shown in FIG. 2. An elastomeric seal 31, such as a closed cell foam gasket, seals vacuum plate 14 upon boat hull 1.

Stand-alone vacuum system 35, shown in FIG. 4, includes vacuum pump 36 having large vacuum hose 37 attached to vacuum manifold 38, wherein vacuum gauge 39 indicates vacuum. Vacuum manifold 38 has a plurality of hose barbs 42, to which are attached vacuum hoses 11. Unused barbs 42 are capped by seal caps 41 to prevent vacuum leakage through vacuum manifold 38.

An overall vacuum and pressure center 45 with vacuum pump 36, being powered by motor 46 plugged into outlet 53, is shown in FIG. 4A. Intake line 48 from manifold to vacuum pump attaches to vacuum manifold 38 and drain spigot 47 drains out accumulated water from the air drawn in by vacuum pump 36. At the boat hull 1, vacuum hoses 11 are attached to vacuum plates 14. The pressure supply side obtains compressed air from an external source via compressed air line 56 which is attached to air inlet filter 49 on air tank 50. Electric heater 54 attached to an electrical power source, such as, for example, outlet 53, heats the compressed air in tank 50 before it is distributed via compressed air manifold 55 and hoses 51 to line filters 52. These lead to input openings in the fiberglass hull skin, in the regions of vacuum plates 14, to aid in drying damaged areas. Compressed air gauge 40 indicates pressure at manifold 55.

FIG. 9 shows a typical hole 85 cut through an exterior fiberglass skin of the side of a boat with the hole saw tool shown in FIG. 5, in the region of a rotted wood core portion 86 of the wood core 20, shown in FIG. 1B before moisture damage thereto, beneath the exterior fiberglass skin of the boat hull.

Core samples are taken through the exterior boat hull fiberglass skin, in the vicinity of the sawed holes shown in FIG. 9. Visual observations are made to see the condition and color of the damaged core sample, to ascertain pulverization and/or rotting of the moisture infested wood blocks, shown in FIG. 1B before moisture damage thereto.

As shown in FIGS. 6, 7 and 8, various straight oriented routing tools (FIG. 6), right angle bent oriented routing tools (FIG. 7) and flexible multidirectional oriented routing tools (FIG. 8) are used to rout out and remove significant chunks and portions of water rooted debris from the damaged wood core portions beneath the exterior fiberglass skin of the boat hull shown in FIGS. 2, 2A, 2B and 9.

FIG. 9A shows a flexible auger including a motor suspended by a hook and hanger loop. The motor rotates a cutting tool by producing power through a flexible shaft, similar to those of tools of Dremel Corporation. The flexible shaft is guided through a stiffening sleeve, such as a high durometer elastomeric tubing slipped at the shaft and handpiece remotely inserted through a hole to an inaccessible area beneath the boat hull skin. The stiffening sleeve assists in guiding the normally too flexible shaft. By adding the stiffening sleeve, the collett holding the cutting tool can be remotely manipulated in place for cutting. Alternatively, a bendable outer covering such as used with a gooseneck lamp can be used over the flexible shaft.

Heat is applied from propane fired hot air heaters through small incisions, similar to incisions for applying vacuum therethrough (as in FIGS. 2, 3 and 4) typically in the top of the damaged area, to dry out the moisture ridden damaged balsa wood core areas 86 of the wood core areas 20, shown in FIG. 1A, similar to the moisture damaged areas 5 of wood core area 4 of prior art FIG. 1, before moisture damage thereto.

As also shown in FIG. 2, during the selective boat hull drying process, vacuum is selectively applied from below, also through small incisions, to promote drying by facilitating circulation of air within the boat hull.

As shown in FIGS. 4 and 4A, vacuum force is selective applied under sealed vacuum draw plates 14 having a preferably centrally located vacuum hose barb 32 connectable to a vacuum hose 11 and vacuum power source 36. The vacuum draw plates 14 are preferably made of transparent but strong materials, such as polycarbonate, and are sealed at respective edges thereof by a gasket 31, such as, for example, a closed cell foam gasket.

As shown in FIGS. 2, 2A, 2B, 4, 4A and 5, vacuum can be selectively applied in a number of moisture ridden areas by a plurality of vacuum draw plates 14 attached by respective vacuum hoses 11 to a vacuum gauge-controlled manifold 38 connected by a further vacuum hose 48 to a vacuum power source 36, such as a commercial electrically powered vacuum pump having an AC power plug and electrical cord.

While direct cleaning out can be done of the moisture infested balsa wood core areas 86, with straight or bent electrically or pneumatically powered routing tools operating within the boundaries of the incisions, it is alternatively known that damaged and/or wet balsa wood material can also be removed remotely from beneath the exterior fiberglass skin of the boat hull, by using routing tools shown in FIGS. 8 and 9A, having flexible neck portion conduits 79 or 95 connecting a routing head to a power supply, wherein the flexible conduits 79 or 95 are used to direct the location of routing tool heads 80 at selected locations beneath uncut portions of the exterior fiberglass skin 2 of the boat hull.

Veining bits are used in straight, angled or flexible necked routing grinder tools (shown in FIGS. 6, 7, 8 and 9A respectively) to remove the damaged balsa wood core blocks shown in FIG. 1B before moisture damage thereto. Butterfly bits and other de-burring bits are used with drills for de-veining and removing damaged core areas.

After the removal of the damaged core, the dry cleaned cavities are filled and re-packed with a re-sealing epoxy resin having a high density filler, such as chopped glass mill fibers. The resin is applied from a dispenser, such as, for example, a manually operable caulking gun, which injects the epoxy resin into the cavities. Alternatively, the caulking gun may be powered by an air pump.

The treated areas are sealed first with ferring compound, then a sealant, such as epoxy, vinyl ester, etc., then covered by a gel coat and finally covered by a waterproof barrier coat such as a creamy gel coat and color of finish gel coat. This sealing process is repeated. For cosmetic finishing of the repaired areas, the areas are wet sanded then treated areas are treated with a surface finishing compound, and finished by sanding and wax compounding of the surface, to restore the treated areas to be as smooth and blemish-free as before treatment.

As noted herein, preventive steps can also be done in accordance with the present invention, to prevent water intrusion and future moisture damage to the boat hull.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A method of preventive maintenance for a boat hull, said boat hull having inner and outer fiberglass skins separated by a balsa wood core in the form of small separated blocks preattached to a fabric like material on one side only of said separate blocks of balsa wood, said method comprising the steps of:

a) disassembling hardware from predetermined areas of said hull, b) removing said hardware from said hull;

c) inspecting said predetermined areas for any moisture damaged balsa wood core, detecting any moisture damaged balsa wood core areas of the hull, boring at least one relatively small hole through a skin at each detected moisture damaged balsa wood core detected area; applying heat to each of the detected moisture damaged balsa wood core areas for drying out said blocks of the balsa wood within said detected moisture damaged balsa wood core areas; after drying of the moisture damaged balsa wood core areas, turning any detected rotted blocks of moisture damaged balsa wood within the detected moisture damaged balsa wood core area into wood chips and debris; de-coring said detected moisture damaged balsa wood core areas, by breaking down said damaged balsa wood core and removing said wood chips and debris from the detected moisture damaged balsa wood core areas through said at least one relatively small hole, thereby forming a cavity within each detected moisture damaged balsa wood core area and filling each said cavity with a filled epoxy, d) reassembling said hardware, and e) sealing said hardware with new sealant.

2. The method of preventive maintenance for a boat hull as in claim 1, wherein said detected moisture damaged balsa wood core area of said hull is the area above the waterline, further comprising the step of removing old sealant from outside of existing hull hardware, inspecting beneath the hull hardware, thereafter repeating steps b, c, d and e of claim 1.

3. A method for preventive maintenance of a boat hull according to claim 2, wherein said detected moisture damaged balsa wood core areas are detected by utilizing a moisture meter.

4. A method for preventive maintenance of a boat hull according to claim 3, wherein detecting said detected moisture damaged balsa wood core areas comprises utilizing a thermal camera.

5. A method for preventive maintenance of a boat hull according to claim 3, wherein detecting said detected moisture damaged balsa wood core areas of the boat hull further comprises placing a graphical grid on the boat to clearly identify said detected moisture damaged balsa wood core areas in identifiable grid squares.

6. A method for preventive maintenance of a boat hull according to claim 5, wherein detecting said detected moisture damaged balsa wood core areas of the boat further comprises recording the date and amount of moisture in each grid square.

7. The method of preventive maintenance for a boat hull as in claim 1 wherein said predetermined area is at least one gunnel, further comprising the step of removing and inspecting any gunnel hardware, thereafter repeating steps b, c, d and e of claim 1, and, drilling drain holes in the gunnel molding on the underpart thereof.

8. The method of preventive maintenance for a boat hull as in claim 1 wherein said predetermined area is the area below the waterline, wherein removing said hardware comprises the step of removing through hull hardware fittings, wherein said de-coring of said moisture balsa wood core damaged areas comprises removing moisture damaged core material to a predetermined depth from the edge of the cutouts associated with the hardware, and, filling said de-cored areas with epoxy before reinstalling the hardware with new sealant.

9. The method of preventive maintenance for a boat hull as in claim 1, wherein after said step of removing hardware said method further comprises the step of drilling appropriate cut-out sections of core to a predetermined depth between respective inner and outer laminate layers of said hull in the area associated with said removed hardware, after said cutout is de-cored and cleaned out, and said cleaned out areas having been filled with an epoxy as in step c of claim 1, after said epoxy is set, sanding said epoxy smooth, and reinstalling said hardware as in paragraph d of claim 1.

10. A method for preventive maintenance of a boat hull according to claim 9, further comprising the step of inducing pressurized air into respective spaces between said inner and outer skins of the boat.

11. A method for preventive maintenance of a boat hull according to claim 1, in which said de-coring of debris comprises routing and turning rotted balsa wood blocks in each cavity into wood chips and debris using a rotary cutting tool entering said cavity through a minimally invasive hole for convenient removal.

12. A method for preventive maintenance of a boat hull according to claim 11, in which the wood chips and debris are removed from said cavity using a vacuum hose connected to said hole.

13. A method for preventive maintenance of a boat hull according to claim 12, in which compressed air is pumped into the troubled areas between said inner and outer skins to aid in drying the troubled areas.

14. A method for preventive maintenance of a boat hull according to claim 1, wherein applying heat to the troubled areas further comprises applying heat to the entire boat.

15. A method for preventive maintenance of a boat hull according to claim 1, wherein applying heat to said detected moisture damaged balsa wood core areas comprises applying heat to predetermined portions of said boat associated with said removed hardware.

16. A method for preventive maintenance of a boat hull according to claim 1, wherein applying heat to the said detected moisture damaged balsa wood core areas comprises applying heat by flash heating the boat.

17. A method for preventive maintenance of a boat hull according to claim 11, further comprising blowing the particles out from the boat through said respective holes of said areas of removed hardware.

* * * * *